United States Patent [19]

Boley

[11] Patent Number: 4,539,023
[45] Date of Patent: Sep. 3, 1985

[54] HORIZONTAL GAS AND LIQUID SEPARATOR

[76] Inventor: Robert E. Boley, 2025 Harsh Ave. SE., P.O. Box 525, Massillon, Ohio 44648

[21] Appl. No.: 665,966

[22] Filed: Oct. 29, 1984

[51] Int. Cl.³ .............................................. B01D 19/00
[52] U.S. Cl. ....................................... 55/174; 55/186; 55/204; 55/206
[58] Field of Search ................ 55/174, 185, 523, 171, 55/186, 52, 172, 173, 175, 176, 188, 184, 45, 183, 257 QV, 257 R, 204, 202, 206

[56] References Cited

U.S. PATENT DOCUMENTS

| | | | |
|---|---|---|---|
| 2,868,315 | 1/1959 | Chaple et al. | 55/186 |
| 3,025,928 | 3/1962 | Heath | 55/45 |
| 3,094,574 | 6/1963 | Glasgow et al. | 55/174 X |
| 3,469,373 | 9/1969 | Lavery et al. | 55/176 X |

Primary Examiner—Charles Hart
Attorney, Agent, or Firm—Harpman & Harpman

[57] ABSTRACT

A device for separating mixtures of gas, liquid hydrocarbons and/or free water provides an elongated horizontally disposed tank with a centrifugal separation device at its inlet end and a substantially large open separating section downstream thereof followed by a mist extractor and a condensate extractor which pass the gas stream through ceramic chips and/or stainless steel mesh as a final separation of liquid droplets from the gas stream.

7 Claims, 3 Drawing Figures

HORIZONTAL GAS AND LIQUID SEPARATOR

BACKGROUND OF THE INVENTION

1. Technical Field

This invention relates to oil and liquid separator apparatus as used at a well head for separating hydrocarbon streams from the well and composed of a mixture of gas, liquid hydrocarbons and/or free water.

2. Description of the Prior Art

Prior separators of this type may be seen in U.S. Pat. Nos. 2,610,697, 2,614,648, 2,656,896, 2,706,531, 2,910,136, 3,212,232 and 2,349,944. In each of the separators in this group of prior art patents, hydrocarbon streams composed of a mixture of gas, liquid hydrocarbons and/or free water are directed through horizontally disposed tanks with various structural arrangements therein for effecting the desired separation. Some of these patents incorporate centrifugal separators as the same are effective when the gas stream flows at a relatively high velocity.

Others incorporate various baffles and collection devices in relatively small separation areas. Such baffles and separation devices are supposed to collect droplets of distilate and/or water impinged thereagainst by the gas stream passing thereover or therethrough. In most of the prior art devices these baffles and collection devices occupy a large area which is considerably more useful if it it left open so that the turbulence of the gas stream leaving the inlet subsides and permits the heavier liquid particles therein to fall to the bottom of the tank.

The present invention introduces the gas stream and its entrained liquid into a horizontally disposed tank by way of a centrifugal separator for the primary separation of the gas liquid stream and provides an unusually large settling section downstream of the centrifugal separator of sufficient capacity to allow the turbulence of the gas stream to subside whereby the heavier liquid particles will fall therefrom. Transverse baffles positioned low in the separation area do not interfere with the gas stream, but inhibit fluid surges in the separated liquid as may otherwise occur. Finally, downstream of the settling section, novel ceramic chip and stainless steel extractors separate distilate and mist from the gas stream.

SUMMARY OF THE INVENTION

A horizontally disposed gas and liquid separator comprises an elongated horizontally disposed tank having a large intermediate section defining a settling section for a gas stream passing therethrough. The gas stream is introduced into an inlet end of the tank upstream of the settling section by way of a centrifugal separator which accomplishes the primary separation of the gas liquid stream and the settling section communicates with an outlet port through two mist extractors utilizing ceramic chips and/or stainless steel mesh. Several transverse baffles positioned low in the settling section of the separator inhibit surges as might otherwise occur in the liquid therein as a result of unusual pressure and flow rates in the gas stream being processed.

DESCRIPTION OF THE PREFERRED EMBODIMENT

Figure 1:
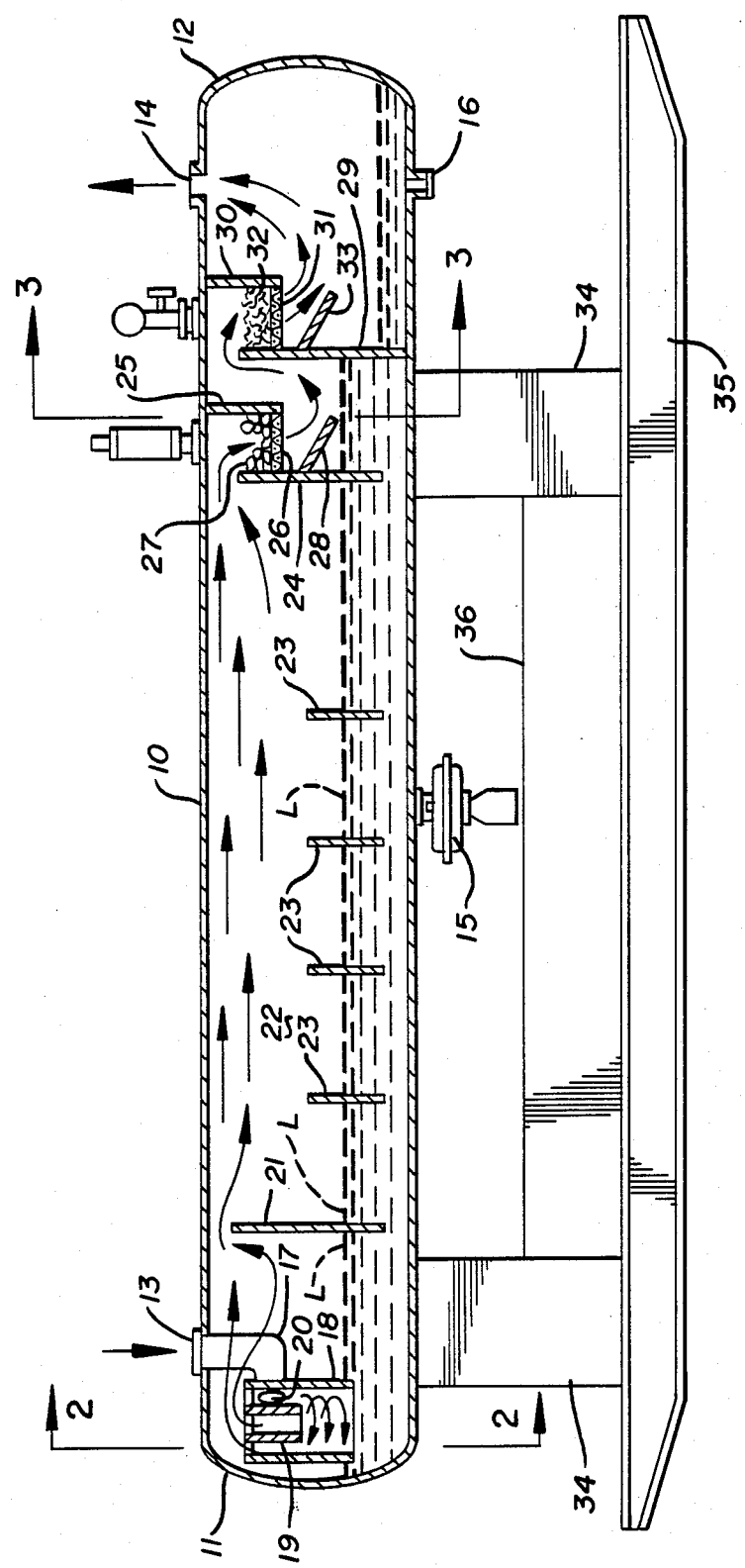
FIG. 1 is a horizontal section of the horizontal gas and liquid separator.

By referring to the drawings and FIG. 1 in particular, it will be seen that the horizontal gas and liquid separator consists of an elongated cross sectionally circular tank 10 having end closures 11 and 12 and inlet and outlet ports 13 and 14 respectively adjacent the end closures 11 and 12 respectively.

A dump valve 15 communicates with the bottom of the tank 10 midway between its ends and a drip section drain 16 communicates with the tank 10 adjacent the end closure 12 and below the outlet port 14. The inlet port 13 is connected by an L-shaped tube 17 with a centrifugal extractor having an outer cylindrical body 18 open at its upper and lower ends and an inner spaced cylindrical body 19, gas having entrained liquids is introduced under pressure through the inlet port 13 and flows through the tubular element 17 and tangentially into the outer cylindrical body 18 of the cylindrical body by way of an inlet opening 20. The gas and its entrained liquid flowing at a high velocity from a well head or the like, centrifugally separates much of the liquid which may be oil, distilate and water from the gas stream, the liquid filling approximately a third of the interior of the tank 10 as indicated by the liquid level L. The lower end of the outer cylindrical body 18 of the centrifugal separator is positioned below the liquid level L so that the gas after passing through the cylindrical separator flows upwardly and outwardly thereof as indicated by the arrows and over a tall baffle 21 positioned transversely of the tank 10 and providing spaces above and below the upper and lower edges of the baffle respectively. The gas then flows through a settling section 22 which is substantially larger than settling sections in the prior art and is relatively free of objects which would interfere with the gas stream or create turbulence therein.

A series of low transverse baffles 23 are positioned in spaced longitudinal relation transversely of the tank 10 in the settling section 22. A secondary tall baffle 24 is positioned downstream of the settling section 22 transversely of the tank 10 with its lower edge below the liquid level L and its upper edge spaced with respect to the upper portion of the tank 10 to form a gas passageway. A third baffle 25 is positioned downstream with respect to the tall baffle 24 transversely of the tank 10 and in sealing relation with the upper portion thereof, a screen 26 forms a transverse support for a plurality of ceramic chips 27 or the like positioned on the screen and forming a mist extractor. An angular baffle 28 is positioned above the liquid level L and below the screen 26.

A transverse partition 29 is positioned transversely of the tank 10 downstream from the secondary tall baffle 24 and the baffle 25 and spaced with respect to a secondary transverse baffle 30 closed with respect to the upper portion of the tank 10. A screen 31 is positioned between the baffle 29 and the baffle 30 and a layer of steel mesh 32 is carried on the screen, the device forming a secondary extractor particularly adapted to separate condensate remaining in the gas stream therefrom. An angular baffle 33 is disposed below the screen 31 and it will be observed that the condensate separated from the gas stream will fall into the lower portion of the tank 10 between the tall baffle 29 and the end closure 12 where it may be removed by the drip drain 16 heretofore referred to.

In FIG. 1 of the drawings arrows show the gas flow through the device and outwardly of the outlet port 14.

The tank 10 is shown supported on standards 34 which in turn may be mounted on skids 35 and the skids 35 may also support a tank 36 which may be used as a heater for the horizontal gas and liquid separator.

Figure 2:
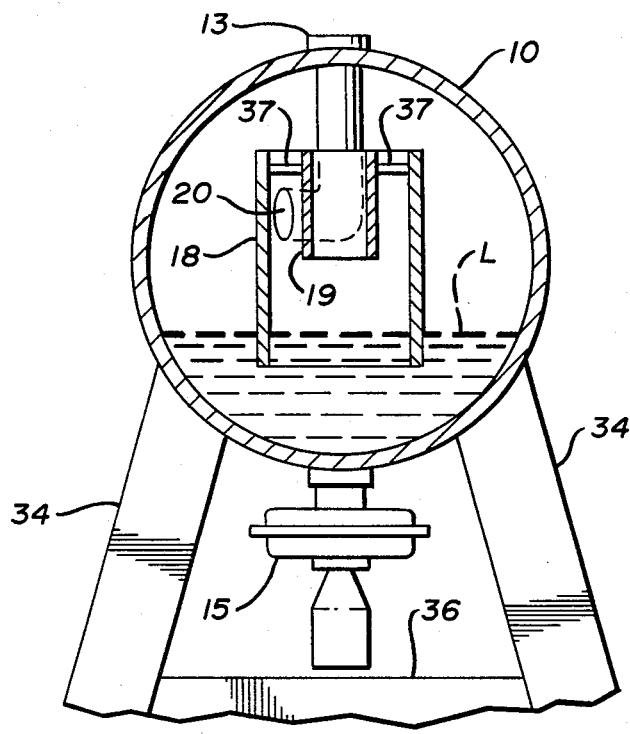
FIG. 2 is an enlarged vertical section on line 2—2 of FIG. 1.

By referring now to FIG. 2 of the drawings an enlarged vertical section on line 2—2 of FIG. 1 may be seen with the inlet port 13 communicating with the L-shaped tubular connection 17 by which the inlet gas is tangentially directed through the opening 20 into the centrifugal separator and specifically the outer cylinder body 18 thereof.

In FIG. 2 of the drawings, a spider 37 will be seen to be positioned with its arms engaged on the outer cylindrical body 18 and the inner cylindrical body 19 and supporting the same in spaced relation.

Figure 3:
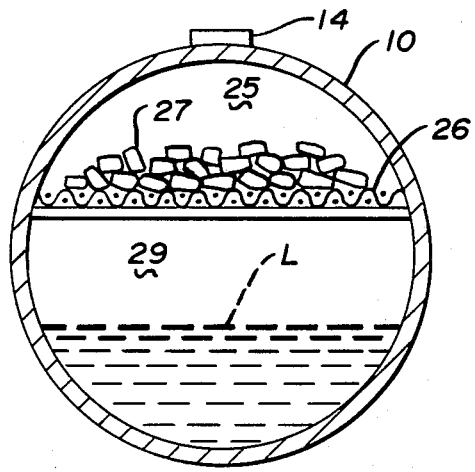
FIG. 3 is an enlarged vertical section on line 3—3 of FIG. 1.

In FIG. 3 of the drawings, the baffle 25 will be seen to form a transverse closure with respect to the downstream end of the settling section 22 of the horizontal gas and liquid separator with the screen 26 and its structural support extending transversely of the tank 10 between the side walls thereof. This structure restricts the gas flow.

By again referring to FIG. 1 of the drawings, it will be seen that the screen 26 and its structural support are also supported by the secondary tall baffle 24 and the third baffle 25. The arrangement is such that a restricted open transverse area in the upper portion of the tank 10 permits the gas stream flowing through the horizontal gas and liquid separator to engage a substantially large area of the primary ceramic mist extractor including the chips 27. The mist extracted by the primary mist extractor is usually largely water and oil and it is collected along with the other liquid in the main portion of the tank 10 and indicated by the letter L as heretofore described.

Still referring to FIG. 1 of the drawings, it will be observed that the lighter liquid mists which are usually condensate are thus not separated from the heavier mists and are in turn subjected to the secondary extractor including stainless steel mesh or the like as indicated at 32 in FIG. 1 of the drawings. It will be understood that the configuration of the secondary extractor is the same as the primary extractor with the exception that stainless steel mesh is substituted for the ceramic chips. The condensate is thus separated from the gas just before it reaches the outlet port 14 and the condensate forms a pool in the bottom of the tank 10 downstream of the tall baffle 39 which closes the middle and lower portion of the interior of the tank 10 with respect to the settling section 10. The gas stream is therefore forced to flow through the settling section where turbulence ends, the heavier liquids drop out and then over the secondary tall baffle 29 down through the primary ceramic mist extractor and the ceramic chips or bodies 27 therein and then upwardly over the tall baffle 29 which forms a partition across all of the interior of the tank 10 except the uppermost portion thereof and flows downwardly through the secondary extractor and the stainless steel mesh 32 therein.

The arrangement is such that the gas stream is very effectively separated from the water, oil and distilate or condensate normally found in gas streams at the well head or the like. The restricted gas flow through the mist extractors results in a pressure drop across the extractor material 27 and 32 causes them to operate at a lower temperature than that of the gas stream thus enhancing the coalescent and extraction properties of the device.

It will thus be seen that a substantially improved and novel structure has been disclosed which forms a highly effective, yet relatively simple, horizontally disposed gas and liquid separator and having thus described my invention, what I claim is:

1. A gas and liquid separator comprising an elongated horizontally disposed separation tank, an inlet port into said separation tank and an outlet port from said separation tank, a first separation means within said separation tank in communication with said inlet port, a series of transverse baffles in said separation tank in longitudinally spaced relation, two of said series of transverse baffles extending across a majority of the interior of said separation tank so as to form passageways above and below said two baffles, the other baffles of said series being positioned below the axial center line of said separation tank so as to form a passageway below the same, a partition transversely of said separation tank forming a passageway thereabove, said partition being positioned downstream of said series of transverse baffles, secondary and third baffles positioned transversely of said separation tank, one being in spaced relation to one of said two baffles and said partition and the other being positioned between said partition and said outlet port so as to form passageways below said secondary baffles and with said one of said two baffles and said partition forming a tortuous passageway for gas flowing through said separation tank, said separation tank formed to contain separated liquid in said passageway below said baffles and mist extraction means in said tortuous passageway.

2. The gas and liquid separator set forth in claim 1 and wherein said first separation means consists of a centrifugal gas and liquid separator device.

3. The gas and liquid separator set forth in claim 1 and wherein said separation tank has an elongated settling section between said two baffles and wherein said other baffles of said series are located in said area.

4. The gas and liquid separator set forth in claim 1 and wherein said mist extraction means consists of a support through which said gas can flow and a plurality of pieces of ceramic material carried on said support.

5. The gas and liquid separator set forth in claim 1 and wherein said mist extraction means consists of a support through which said gas flow and stainless steel mesh positioned thereon.

6. The gas and liquid separator set forth in claim 1 and wherein said mist extraction means consists of a support through which said gas can flow and stainless steel wool positioned thereon and wherein a separate sump for mist extracted by said extraction means collects condensate.

7. The gas and liquid separator set forth in claim 1 and wherein said mist extraction means is positioned transversely of said separation tank and above the axial center line thereof so as to define a passageway thereabove communicating with said mist extraction means.

* * * * *